United States Patent
Machida et al.

(10) Patent No.: US 10,854,935 B2
(45) Date of Patent: Dec. 1, 2020

(54) SECONDARY BATTERY SYSTEM, VEHICLE INCLUDING THE SAME, AND METHOD FOR CONTROLLING BATTERY

(71) Applicants: TOYOTA JIDOSHA KABUSHIKI KAISHA, Toyota (JP); DENSO TEN Limited, Kobe (JP)

(72) Inventors: Kiyohito Machida, Aichi-gun (JP); Yoshihiro Uchida, Nagakute (JP); Takuhiro Ohtani, Kobe (JP)

(73) Assignees: TOYOTA JIDOSHA KABUSHIKI KAISHA, Toyota (JP); DENSO TEN Limited, Kobe (JP)

( * ) Notice: Subject to any disclaimer, the term of this patent is extended or adjusted under 35 U.S.C. 154(b) by 141 days.

(21) Appl. No.: 16/250,062

(22) Filed: Jan. 17, 2019

(65) Prior Publication Data
US 2019/0229382 A1 Jul. 25, 2019

(30) Foreign Application Priority Data

Jan. 19, 2018 (JP) .................................. 2018-007384

(51) Int. Cl.

| H02J 7/00 | (2006.01) |
|---|---|
| H01M 10/615 | (2014.01) |
| H01M 10/635 | (2014.01) |
| B60L 58/12 | (2019.01) |
| B60L 58/24 | (2019.01) |
| H01M 10/625 | (2014.01) |
| H01M 10/0525 | (2010.01) |
| B60L 50/60 | (2019.01) |
| B60K 6/28 | (2007.10) |

(52) U.S. Cl.
CPC ........... *H01M 10/615* (2015.04); *B60L 58/12* (2019.02); *B60L 58/24* (2019.02); *H01M 10/625* (2015.04); *H01M 10/635* (2015.04); *H02J 7/007192* (2020.01); *B60K 6/28* (2013.01); *B60L 50/60* (2019.02); *B60L 2240/545* (2013.01); *B60Y 2200/91* (2013.01); *B60Y 2200/92* (2013.01); *B60Y 2300/91* (2013.01); *B60Y 2400/112* (2013.01); *H01M 10/0525* (2013.01); *H01M 2220/20* (2013.01)

(58) Field of Classification Search
CPC ........................ H01M 10/615; H02J 7/007192
USPC ......................................... 320/144, 150, 153
See application file for complete search history.

(56) References Cited

U.S. PATENT DOCUMENTS

2011/0127958 A1   6/2011  Ishishita et al.

FOREIGN PATENT DOCUMENTS

| JP | 2015-176821 A | 10/2015 |
|---|---|---|
| JP | 2017-091817 A | 5/2017 |
| WO | 2010/005079 A1 | 1/2010 |

*Primary Examiner* — Edward Tso
*Assistant Examiner* — Ahmed H Omar
(74) *Attorney, Agent, or Firm* — Sughrue Mion, PLLC

(57) ABSTRACT

When the temperature of a battery is below a prescribed temperature during execution of a lithium deposition suppression control, an ECU executes a temperature raising control for raising the temperature of the battery by repeating charging and discharging of the battery. The temperature raising control is a control for: when the magnitude of a target current is below a first threshold value that is greater than 0, prohibiting charging of the battery by restricting an allowable charging power to 0, while discharging the battery; and when the magnitude of an allowable current exceeds a second threshold value, resuming charging of the battery by canceling restriction on the allowable charging power.

4 Claims, 6 Drawing Sheets

| | | | SOC | | | |
|---|---|---|---|---|---|---|
| | | | 10% | 15% | 20% | |
| TB | 0°C | ... | Ioff | Ioff | Ioff | ... |
| | -1°C | ... | Ioff | Ioff | Ioff | ... |
| | -2°C | ... | Ioff | Ioff | Ioff | ... |
| | -3°C | ... | Ioff | Ioff | Ioff | ... |
| | -4°C | ... | Ioff | Ioff | Ioff | ... |
| | | ⋰ | ⋮ | ⋮ | ⋮ | ⋱ |

SECONDARY BATTERY SYSTEM, VEHICLE INCLUDING THE SAME, AND METHOD FOR CONTROLLING BATTERY

This nonprovisional application is based on Japanese Patent Application No. 2018-007384 filed on Jan. 19, 2018 with the Japan Patent Office, the entire contents of which are hereby incorporated by reference.

BACKGROUND

Field

The present disclosure relates to a secondary battery system, a vehicle including the same, and a method for controlling a battery, and particularly relates to control for charging and discharging a lithium-ion secondary battery.

Description of the Background Art

In recent years, with the increase in awareness of the environment, electric-powered vehicles, such as hybrid vehicles and electric vehicles, have been developed as environment-friendly vehicles. As a driving battery for these electric-powered vehicles, a lithium-ion secondary battery has been suitably employed because of its high energy density and high operating voltage.

A phenomenon is known in which metallic lithium deposits on the anode surface when a lithium-ion secondary battery is charged with a high current. This phenomenon is hereinafter also referred to as "lithium deposition". The lithium deposition conspicuously occurs especially under a low-temperature environment. If the lithium deposition occurs, a lithium-ion secondary battery may deteriorate and degrade in performance. Thus, techniques for charging a lithium-ion secondary battery while suppressing the lithium deposition have been proposed.

For example, according to the charging method disclosed in Japanese Patent Laying-Open No. 2015-176821, a pulse charge and discharge process is performed in which a battery pack is alternately charged and discharged before the main charging of the battery pack. This pulse charge and discharge process generates Joule's heat which raises the battery pack temperature. When the battery pack temperature is raised to a prescribed temperature, then the main charging of the battery pack is performed.

SUMMARY

For example, WO 2010/005079 describes control for suppressing the lithium deposition. This control is herein referred to as "lithium deposition suppression control". In the lithium deposition suppression control, an allowable current (Ilim) is calculated as the maximum current that does not cause deposition of metallic lithium on the battery anode, and a target current (Itag) is calculated by adding an offset current in the discharging direction to the allowable current. Further, an allowable charging power for the battery is set based on the target current. The battery charging is controlled so that the magnitude of the charging power for the battery does not exceed the magnitude of the allowable charging power (Iwin).

The magnitude of the allowable current decreases with charging of the battery, and increases with discharging of the battery. Similarly, the target current decreases with charging of the battery, and increases with discharging of the battery.

As will be described later in detail, when a battery has a low temperature (in particular, a very low temperature), the battery charging decreases the magnitude of the target current at a higher rate than when the battery has a relatively high temperature. Therefore, the target current can quickly decrease to 0. Then, the allowable charging power also becomes 0, and the battery charging stops.

The battery charging generates Joule's heat as described in Japanese Patent Laying-Open No. 2015-176821. When a battery has a low temperature, the period from the start of charging to the stop of charging for the battery is short. Accordingly, the battery charging will stop before the battery temperature is sufficiently raised by Joule's heat. In the feedback control using the deviation of the charging current from the target current for the battery, the deviation is converged at 0 during the stop of charging. Therefore, after the stop of charging, the battery charging is not resumed and the charging stop state is maintained. That is, while the battery can be protected from the lithium deposition, the battery charging cannot progress.

The present disclosure has been made to solve the above problem, and an object of the present disclosure is to provide a technique, in charging a battery (lithium-ion secondary battery) at a low temperature, to progress the battery charging while protecting the battery from the lithium deposition.

(1) A secondary battery system according to an aspect of the present disclosure includes: a battery which is a lithium-ion secondary battery; and a controller configured to execute a lithium deposition suppression control for suppressing deposition of metallic lithium on an anode of the battery when the battery is charged. The controller is configured, in the lithium deposition suppression control, to: calculate an allowable current so that the allowable current decreases with charging of the battery and so that the allowable current increases with discharging of the battery, the allowable current being the maximum current that does not cause deposition of the metallic lithium on the anode; calculate a target current by adding an offset current in the discharging direction to the allowable current; calculate an allowable charging power for the battery by a feedback control using the deviation of the charging current from the target current to the battery; and control charging of the battery so that the magnitude of a charging power to the battery does not exceed the magnitude of the allowable charging power. The controller is configured to, when the temperature of the battery is below a prescribed temperature during execution of the lithium deposition suppression control, further execute a temperature raising control for raising the temperature of the battery by repeating charging and discharging of the battery. The controller is configured, in the temperature raising control, to: when the magnitude of the target current is below a first threshold value that is greater than 0, prohibit charging of the battery by restricting the allowable charging power to 0, while discharging the battery; and when the magnitude of the allowable current exceeds a second threshold value, resume charging of the battery by canceling the restriction on the allowable charging power. Preferably, the feedback control is a PI control using the deviation of the charging current from the target current for the battery as the proportional element and the integral element.

According to the feature of the above (1), the execution of the lithium deposition suppression control can protect the battery from the lithium deposition. Further, as will be described in detail later, when the magnitude of the target current is below a prescribed value, the temperature raising control is executed to restrict the allowable charging power to 0, thus preventing the target current of the battery from becoming 0. This prevents the charging stop state of the battery from being maintained in the feedback control and allows the battery charging to progress. Thus, it is possible to progress charging of the battery while protecting the battery from the lithium deposition.

(2) The controller is configured to refer to the correspondence relation among the state of charge (SOC) of the battery, the temperature of the battery, and the offset current, to calculate the offset current from the SOC and the temperature of the battery.

According to the feature of the above (2), the offset current can be set to a value suitable for the SOC and the temperature of the battery. For example, when the battery temperature is a very low temperature (e.g. −35° C.), there is a greater need for executing the temperature raising control to raise the battery temperature than when the battery temperature is not a very low temperature, though still a low temperature (e.g. −10° C.). Accordingly, when the battery temperature is a very low temperature, the offset current can be set to a greater value in the discharging direction than when the battery temperature is not a very low temperature. Thus, as the battery temperature is a lower, the magnitude of the target current will go below the prescribed value more easily, and the temperature raising control is more likely to be executed. Therefore, protection of the battery and charging of the battery can be both achieved more reliably.

(3) A vehicle according to another aspect of the present disclosure includes the secondary battery system of the above (1), (2).

According to the feature of the above (3), a vehicle can be provided that can charge the battery while protecting the battery from the lithium deposition.

(4) A method for controlling a battery according to still another aspect of the present disclosure charges a battery which is a lithium-ion secondary battery. The method for charging a battery includes executing a lithium deposition suppression control for suppressing deposition of metallic lithium on an anode of the battery when the battery is charged. The executing of the lithium deposition suppression control includes first to third steps. The first step is calculating an allowable current so that the allowable current decreases with charging of the battery and so that the allowable current increases with discharging of the battery, the allowable current being the maximum current that does not cause deposition of the metallic lithium on the anode. The second step is calculating a target current by adding an offset current in the discharging direction to the allowable current. The third step is setting an allowable charging power for the battery by a feedback control using the deviation of the charging current from the target current to the battery. Charging of the battery is controlled so that the magnitude of a charging power to the battery does not exceed the magnitude of the allowable charging power. The method for controlling the battery further includes, when the temperature of the battery is below a prescribed temperature during execution of the lithium deposition suppression control, executing a temperature raising control for raising the temperature of the battery by repeating charging and discharging of the battery. The temperature raising control is a control for: when the magnitude of the target current is below a first threshold value that is greater than 0, prohibiting charging of the battery by restricting the allowable charging power to 0, while discharging the battery; and when the magnitude of the allowable current exceeds a second threshold value, resuming charging of the battery by canceling restriction on the allowable charging power.

According to the method of the above (4), it is possible to progress charging of the battery while protecting the battery from the lithium deposition, as with the feature of the above (1).

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

An embodiment of the present disclosure is described in detail hereinafter with reference to the drawings. Identical or corresponding parts in the drawings are identically denoted, and the explanation thereof is not repeated.

Embodiment

Configuration of External Charging System

Figure 1:
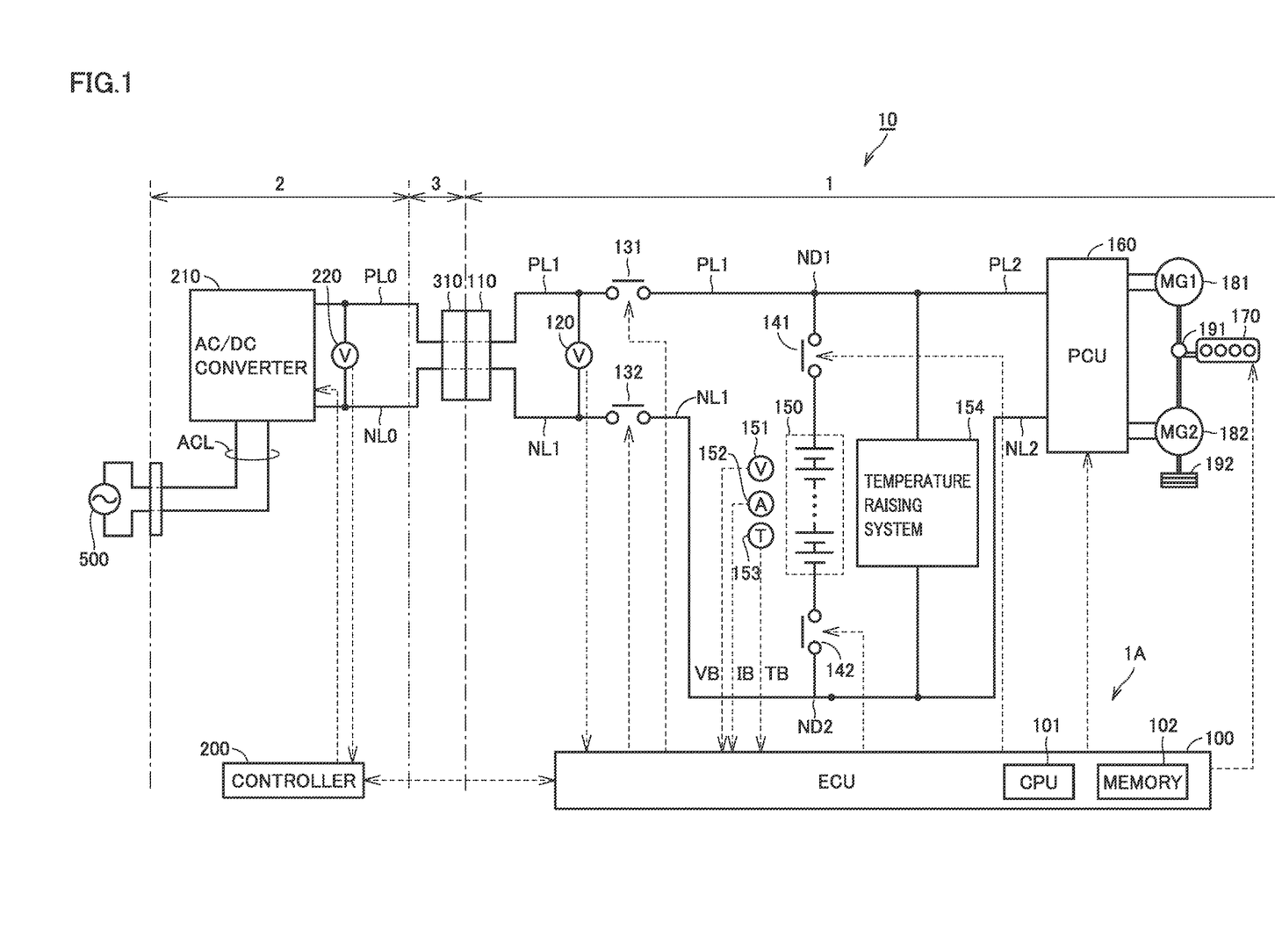
FIG. 1 is a block diagram schematically showing the general configuration of an external charging system in the present embodiment.

FIG. 1 is a block diagram schematically showing the general configuration of an external charging system for a vehicle according to the present embodiment. An external charging system 10 includes a vehicle 1 and a charging station 2. As shown in FIG. 1, vehicle 1 and charging station 2 are electrically connectable to each other via a charging cable 3.

Charging station 2 is a charging station for, for example, DC charging. Charging station 2 converts AC power from a system power supply 500 into DC power and outputs the DC power for charging a battery 150 mounted on vehicle 1. Charging station 2 includes a power line ACL, an AC/DC converter 210, a voltage sensor 220, electric supply lines PL0, NL0, and a controller 200.

Power line ACL is electrically connected to system power supply 500. Power line ACL transmits AC power from system power supply 500 to AC/DC converter 210.

AC/DC converter 210 converts AC power on power line ACL into DC power for charging battery 150 mounted on vehicle 1. The power conversion by AC/DC converter 210 may be performed by a combination of AC/DC conversion for power-factor improvement and DC/DC conversion for voltage level adjustment. DC power outputted from AC/DC converter 210 is supplied through the cathode-side electric supply line PL0 and the anode-side electric supply line NL0.

Voltage sensor 220 is provided between electric supply lines PL0, NL0. Voltage sensor 220 detects the voltage between electric supply lines PL0, NL0 and outputs the detection result to controller 200.

Controller 200 includes a central processing unit (CPU), a memory, and an input/output port, which are not shown. Controller 200 controls charging station 2 based on the voltage detected by voltage sensor 220, various types of switches, the signal from vehicle 1, and a map and a program stored in the memory.

Vehicle 1, which is a plug-in hybrid vehicle, includes an inlet 110, charging lines PL1, NL1, a voltage sensor 120, charge relays 131, 132, system main relays 141, 142, battery 150, power lines PL2, NL2, a power control unit (PCU) 160, an engine 170, motor generators 181, 182, a motive power dividing mechanism 191, a driving wheel 192, and an ECU 100. Battery 150 and ECU 100 constitute a secondary battery system 1A. Vehicle 1 may be an electric vehicle.

Inlet 110 is electrically connectable to a connector 310 of charging cable 3. Connection of inlet 110 and connector 310 to each other by mechanical coupling, such as fitting, allows electrical connection between electric supply line PL0 and the cathode-side contact point of inlet 110, and also allows electrical connection between electric supply line NL0 and the anode-side contact point of inlet 110. Also, connection of inlet 110 and connector 310 to each other with the charging cable allows ECU 100 of vehicle 1 and controller 200 of charging station 2 to mutually exchange various types of signals, instructions, and information (data) in accordance with prescribed communication standards, such as Controller Area Network (CAN).

Voltage sensor 120 is provided between charging line PL1 and charging line NL1 on the inlet 110 side relative to charge relays 131, 132. Voltage sensor 120 detects the DC voltage between charging lines PL1, NL1 and outputs the detection result to ECU 100.

Charge relay 131 is connected to charging line PL1, and charge relay 132 is connected to charging line NL1. Closing/opening of charge relays 131, 132 is controlled in accordance with the instruction from ECU 100. When charge relays 131, 132 are closed and system main relays 141, 142 are closed, then electric power can be transferred between inlet 110 and battery 150.

Battery 150 supplies electric power for generating the driving force for vehicle 1. Also, battery 150 stores electric power generated by motor generators 181, 182. Battery 150 is a battery pack including a plurality of cells (not shown), each cell being a lithium-ion secondary battery. The battery pack, which may have any internal configuration in the present embodiment, is hereinafter simply referred to as battery 150 without particularly referring to the cells.

The cathode of battery 150 is electrically connected to a node ND1 via system main relay 141. Node ND1 is electrically connected to charging line PL1 and power line PL2. Similarly, the anode of battery 150 is electrically connected to a node ND2 via system main relay 142. Node ND2 is electrically connected to charging line NL1 and power line NL2. Closing/opening of system main relays 141, 142 is controlled in accordance with the instruction from ECU 100.

Battery 150 is provided with a voltage sensor 151, a current sensor 152, and a temperature sensor 153. Voltage sensor 151 detects a voltage VB of battery 150. Current sensor 152 detects a current IB inputted to and outputted from battery 150. Temperature sensor 153 detects a temperature of battery 150. Each sensor outputs the detection result to ECU 100.

Battery 150 is further provided with a temperature raising system 154 for heating battery 150 when temperature TB of battery 150 is a very low temperature. Temperature raising system 154 includes, for example, a DC/DC converter (not shown) for stepping down the voltage of the electric power supplied from PCU 160, and an electric heater (not shown) that consumes the electric power after the step-down by the DC/DC converter and generates heat. The temperature raising operation by temperature raising system 154 is controlled in accordance with the instruction from ECU 100.

PCU 160 is electrically connected between power lines PL2, NL2 and motor generators 181, 182. PCU 160 includes a converter and an inverter, which are not shown, and performs bidirectional power conversion between battery 150 and motor generators 181, 182 when system main relays 141, 142 are closed.

Engine 170 is an internal combustion engine, such as a gasoline engine. Engine 170 generates the driving force for vehicle 1 to travel, in accordance with the control signal from ECU 100.

Each of motor generators 181, 182 is a three-phase AC motor. Motor generator 181 is coupled to the crankshaft of engine 170 via motive power dividing mechanism 191. When engine 170 is started up, motor generator 181 rotates the crankshaft of engine 170 using the electric power from battery 150. Motor generator 181 can also generate electric power using the motive power of engine 170. The AC power generated by motor generator 181 is converted into DC power by PCU 160 to charge battery 150. The AC power generated by motor generator 181 may also be supplied to motor generator 182.

Motor generator 182 rotates the drive shaft using at least one of the electric power from battery 150 and the electric power generated by motor generator 181. Motor generator 182 can also generate power by regenerative braking. The AC power generated by motor generator 182 is converted into DC power by PCU 160 to charge battery 150.

Motive power dividing mechanism 191, which is epicyclic gearing for example, mechanically couples the three elements: the crankshaft of engine 170, the rotating shaft of motor generator 181, and the drive shaft.

Similar to controller 200, ECU 100 includes a CPU 101, a memory 102 (such as a read only memory [ROM] and random access memory [RAM]), and an input/output port (not shown). ECU 100 controls the devices in accordance with the signal from each sensor and the like, so that vehicle 1 will be in a desired state. Examples of the main control to be executed by ECU 100 include "external charging" for charging on-vehicle battery 150 with the electric power supplied from charging station 2. The external charging is carried out by mutual exchange of signals, instructions, and information between ECU 100 of vehicle 1 and controller 200 of charging station 2 via charging cable 3.

Lithium Deposition Suppression Control

External charging system 10 configured as above uses a battery pack of lithium-ion secondary battery, as battery 150. It is known that, in such a case, some charging modes of battery 150 may cause lithium metal to deposit on the anode surface of the lithium-ion secondary battery, thus causing heat generation or performance degradation of battery 150. Accordingly, in the present embodiment, "lithium deposition suppression control" is executed to suppress deposition of lithium metal, as described below. The lithium deposition suppression control is described below in outline, the details of which are described in WO 2010/005079 for example.

Figure 2:
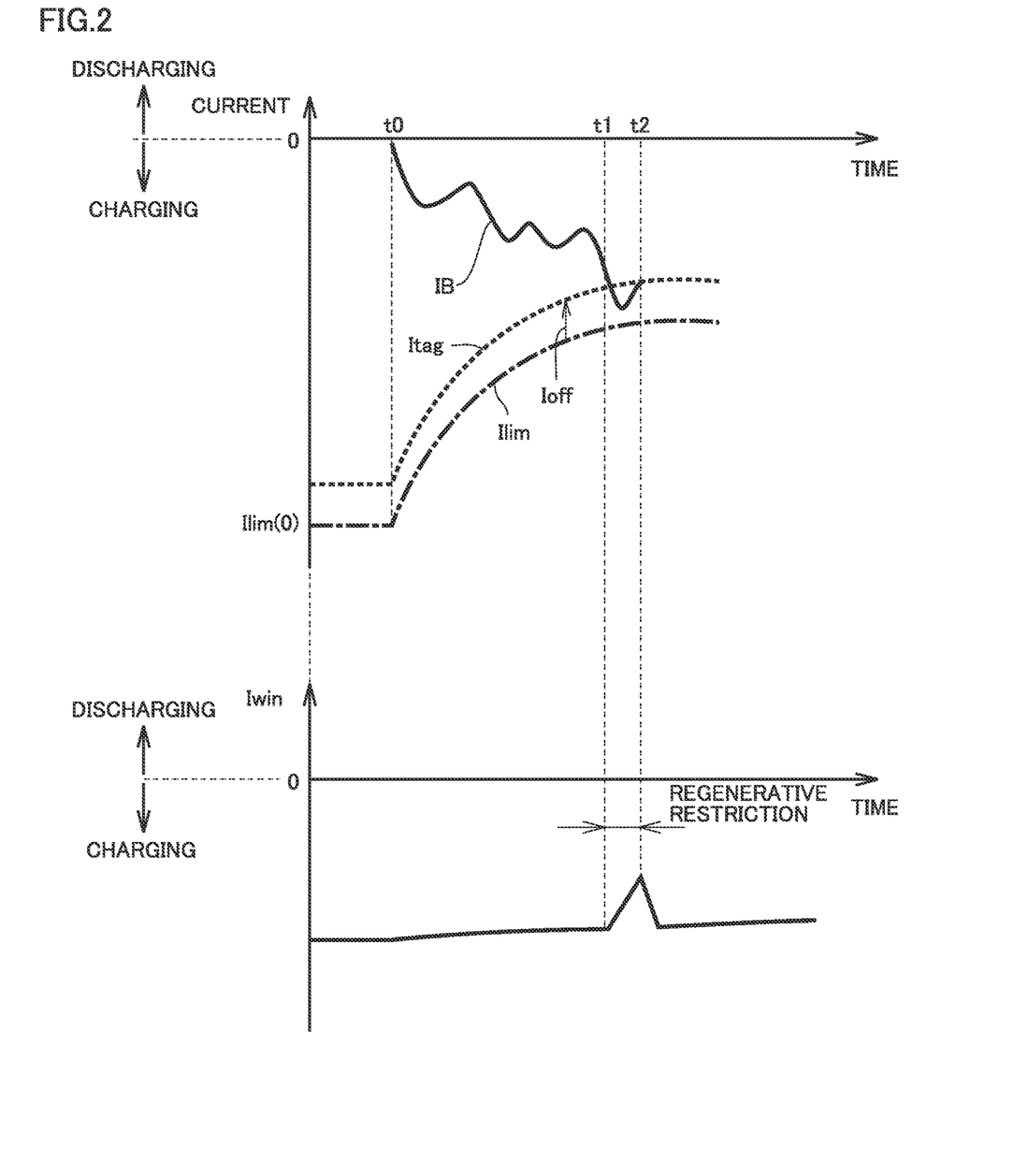
FIG. 2 is a time chart for explaining the outline of the lithium deposition suppression control.

FIG. 2 is a time chart for explaining the outline of the lithium deposition suppression control. In FIG. 2, the horizontal axis represents the elapsed time. The vertical axis represents current IB and allowable charging power Iwin of battery 150, in this order from the top. The discharging direction from battery 150 is defined as the positive direction, and the charging direction to charging battery 150 is defined as the negative direction. Allowable charging power Iwin is the control upper limit of charging power for battery 150. When battery 150 is charged in such a way that the magnitude of charging power for battery 150 does not exceed the magnitude of allowable charging power Iwin, deposition of lithium metal on the anode surface can be suppressed.

FIG. 2 shows a situation in which battery 150 is charged with electric power generated by regenerative braking of motor generator 182 while vehicle 1 is traveling. With reference to FIG. 2, allowable current Ilim of battery 150 is calculated in accordance with the charging history or discharging history (in this case, the charging history) of battery 150. Allowable current Ilim is the maximum current that does not cause deposition of lithium metal due to decrease in anode potential of battery 150 down to the lithium reference potential (the potential of lithium metal).

Specifically, allowable current Ilim is repeatedly calculated in accordance with the following formula (1) for each prescribed arithmetic cycle (see, for example, WO 2010/005079). In formula (1), the parameters of the current arithmetic cycle have a suffix of (t), and the parameters of the last arithmetic cycle have a suffix of (t−1). The character dt denotes the length of arithmetic cycle.

$$I_{lim}(t) = I_{lim}(t-1) - \alpha(TB, SOC) \times IB(t) \times dt - \beta(TB, SOC) \times \frac{I_{lim}(0) - I_{lim}(t-1)}{I_{lim}(0)} \times dt \quad (1)$$

The second term on the right side in formula (1) is the term representing the amount of decrease in magnitude of the allowable current per unit time associated with charging of battery 150 (hereinafter also referred to as a "decrease term"). The third term on the right side is the term representing the amount of increase in magnitude of the allowable current per unit time associated with discharging (stop of charging) of battery 150 or associated with leaving battery 150 as it is (hereinafter also referred to as an "increase term"). The coefficient $\alpha$ in the decrease term and the coefficient $\beta$ in the increase term are both the function of temperature TB and the SOC of battery 150.

By adding or subtracting the decrease term and the increase term to and from the allowable current (initial value Ilim (0)) with no charging history or discharging history for each arithmetic cycle, allowable current Ilim (t) can be successively calculated.

In addition to allowable current Ilim calculated as described above, an offset current Ioff for allowing a margin for a sudden change in current IB is also calculated. By offsetting allowable current Ilim in the discharging direction by offset current Ioff, a target current Itag is set (Ilim+Ioff=Itag).

As shown in FIG. 2, when charging of battery 150 starts at time t0, current IB changes in the charging direction. The subsequent continuous charging causes allowable current Ilim and target current Itag to change in the discharging direction. That is, the allowable charging current (|IB|) gradually decreases.

When the magnitude of current IB is greater than or equal to the magnitude of target current Itag (|IB|≥|Itag|) at time t1, current IB needs to be restricted in order to suppress deposition of lithium metal. Accordingly, the charging power (in this example, regenerative electric power) is restricted by changing allowable charging power Iwin in the discharging direction from time t1 (by reducing allowable charging power Iwin, as it were). Specifically, allowable charging power Iwin is calculated from current IB and target current Itag in accordance with the following formula (2) which expresses proportional-integral (PI) control.

$$I_{win}(t) = W0(t) - Kp \times \{IB(t) - I_{tag}(t)\} - Ki \int \{IB(t) - I_{tag}(t)\} dt \quad (2)$$

In formula (2), W0 denotes the specified value (base value) of the allowable charging power. Base value W0 is determined based on temperature TB of battery 150. Kp denotes the feedback gain of the proportional control (P control), and Ki denotes the feedback gain of the integral control (I control). This PI control decreases the magnitude |Iwin| of the allowable charging power. Restricting (reducing) allowable charging power Iwin in this way is also referred to as "regenerative restriction".

The PI control corresponds to the "feedback control" according to the present disclosure. The "feedback control" according to the present disclosure, however, is not limited to the PI control but may be, for example, proportional-integral-differential (PID) control.

The regenerative restriction from time t1 decreases current IB that flows through battery 150. Then, at time t2, the magnitude of current IB becomes smaller than the magnitude of target current Itag again (|IB|<|Itag|). Accordingly, from time t2, the regenerative restriction is canceled. Thus, allowable charging power Iwin gradually recovers to the normal value.

Thus, at the time of regenerative braking which generates a high charging current, in order to suppress deposition of lithium metal, the regenerative restriction in which allowable charging power Iwin is reduced is started when the magnitude of current IB becomes greater than or equal to the magnitude of target current Itag. Accordingly, current IB that flows through battery 150 decreases. After that, when the magnitude of current IB recovers to less than the magnitude of target current Itag, the regenerative restriction in which allowable charging power Iwin is reduced is canceled. Executing such control can suppress deposition of lithium metal on the anode surface.

Lithium Deposition Suppression Control During External Charging

FIG. 2 describes the lithium deposition suppression control in the case in which battery 150 is charged by regenerative braking of vehicle 1. Next, the lithium deposition suppression control during external charging will now be described. As described above, when temperature TB of battery 150 is a very low temperature, temperature raising system 154 is driven for raising the temperature of battery 150. The following description assumes external charging under a very low temperature environment, in which temperature raising system 154 is driven.

For easier understanding of external charging in the present embodiment, first, the lithium deposition suppression control in a comparative example is explained hereinafter.

Figure 3:
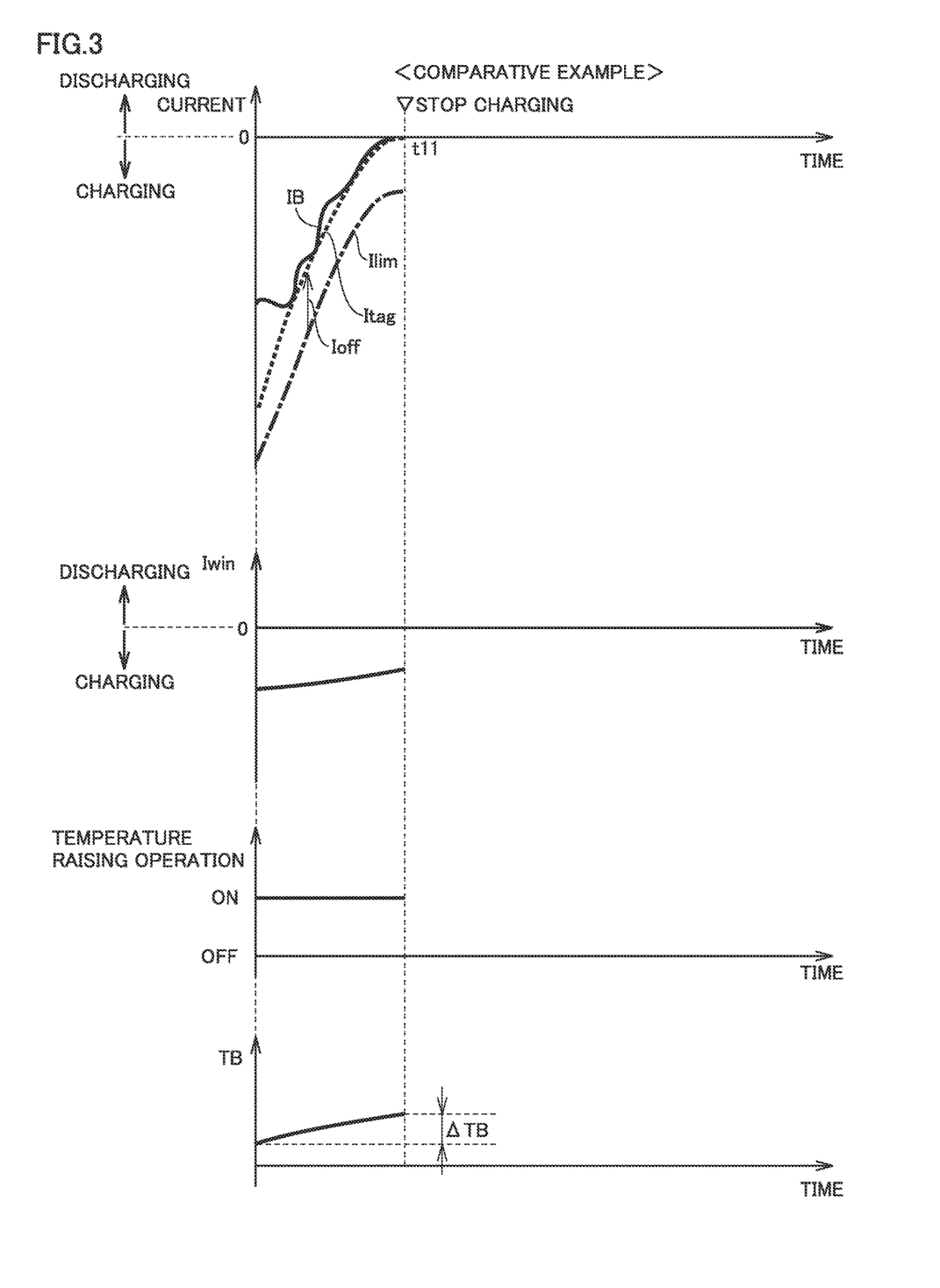
FIG. 3 is a diagram for explaining the lithium deposition suppression control during external charging in a comparative example.

FIG. 3 is a diagram for explaining the lithium deposition suppression control during external charging in a comparative example. In FIG. 3 and later-described FIG. 4, the horizontal axis represents the elapsed time. The vertical axis represents current IB, allowable charging power Iwin, execution/non-execution of the temperature raising operation by temperature raising system 154, and temperature TB of battery 150, in this order from the top.

When temperature TB of battery 150 is a low temperature (in particular, a very low temperature of about −30° C.), the decrease rate of the magnitude of target current Itag is higher than when temperature TB of battery 150 is relatively high. Accordingly, target current Itag quickly reaches 0 (see time t11). Then, in the above-described PI control (see formula (2)), the state in which current IB coincides with target current Itag is reached (IB=Itag), and therefore allowable charging power Iwin becomes equal to base value W0. When W0=0 is satisfied under a very low temperature, then allowable charging power Iwin is also 0. As a result, charging of battery 150 is stopped.

In the comparative example, since the magnitude of target current Itag has a high decrease rate, charging of battery 150 is stopped in a short time. Accordingly, charging of battery 150 is stopped before temperature TB of battery 150 is sufficiently raised. After the stop of charging, the state in which current IB coincides with target current Itag continues, and thus the stop of charging of battery 150 is maintained. That is, charging of battery 150 cannot be resumed.

Accordingly, in the present embodiment, intermittent charging (repeated charging and discharging) of battery 150 is achieved by prohibiting charging of battery 150 earlier on purpose than in the comparative example, thereby allowing for time to raise the temperature of battery 150. Hereinafter the lithium deposition suppression control in the present embodiment will be explained in detail.

Lithium Deposition Suppression Control in the Present Embodiment

Figure 4:
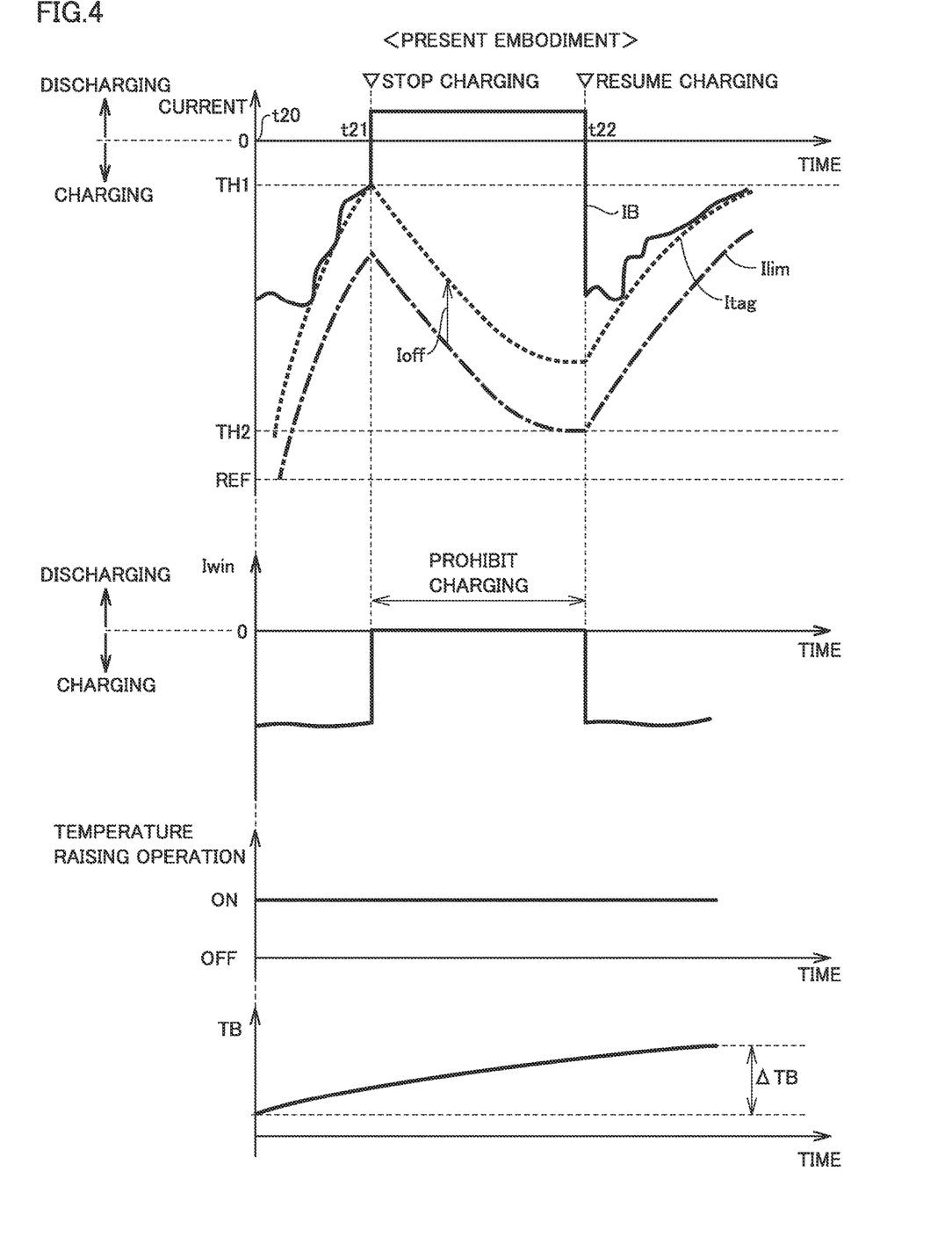
FIG. 4 is a time chart for explaining the lithium deposition suppression control during external charging in the present embodiment.

FIG. 4 is a time chart for explaining the lithium deposition suppression control during external charging in the present embodiment. With reference to FIG. 4, in the present embodiment, a first threshold value TH1, a reference value REF, and a second threshold value TH2 are determined for current IB of battery 150.

First threshold value TH1 is used to switch charging of battery 150 (specifically, to stop charging). The magnitude of first threshold value TH1 is greater than 0.

Reference value REF represents the maximum current (a fixed value independent of the time) that can suppress deposition of metallic lithium on the anode of battery 150.

Second threshold value TH2 is used to switch charging of battery 150 (specifically, to resume charging), separately from first threshold value TH1. The magnitude of second threshold value TH2 is greater than the magnitude of first threshold value TH1 and smaller than the magnitude of reference value REF. By way of example, the magnitude of second threshold value TH2 is about 80% of the magnitude of reference value REF.

As described above, the magnitude of target current Itag decreases with external charging and reaches first threshold value TH1 at time t21. At this point of time, the magnitude of allowable charging power Iwin has not reached 0.

In the present embodiment, however, when target current Itag reaches first threshold value TH1, allowable charging power Iwin is restricted. Specifically, allowable charging power Iwin is forcibly set to 0, instead of being calculated based on the above formula (2). Accordingly, charging of battery 150 is stopped. When charging of battery 150 is stopped (i.e., when IB=0 is set), then the decrease term is 0 while the increase term is maintained, thus allowing allowable current Ilim to recover, according to formula (1).

During the period from time t21 to time t22 during which allowable charging power Iwin is set to 0, charging of battery 150 is prohibited while discharging of battery 150 is permitted. Therefore, battery 150 is discharged and supplies electric power to temperature raising system 154. This allows temperature raising system 154 to continue the temperature raising operation and causes a discharging current to flow to generate Joule's heat. Thus, temperature TB of battery 150 is raised.

Discharging of battery 150 may be achieved by battery 150 supplying power to auxiliary machinery (not shown), in addition to or as an alternative to temperature raising system 154. That is, temperature raising system 154 is not essential for the present disclosure. Although FIG. 4 shows an example in which current IB (discharging current) is constant during the period of discharging of battery 150, the discharging current may change over time.

During the period from time t21 to time t22, the magnitude of allowable current Ilim increases with the increase in temperature TB of battery 150. In other words, allowable current Ilim recovers. Then, when the magnitude of allowable current Ilim exceeds second threshold value TH2 at time t22, the restriction on allowable charging power Iwin is relaxed (specifically, canceled). That is, charging of battery 150 is permitted again. When the restriction is relaxed, allowable charging power Iwin is again calculated in accordance with the above formula (2).

As described in FIG. 4, in the present embodiment, first threshold value TH1 and second threshold value TH2 are set, and these threshold values are used to execute the "temperature raising control" in which stop of charging and resumption of charging of battery 150 are repeated. Thus, a period during which charging of battery 150 is prohibited (prohibition period) and a period during which charging of battery 150 is permitted (permission period) are repeated. Since allowable current Ilim recovers during a prohibition period, charging of battery 150 is permitted again during the permission period next to the prohibition period. The inclusion of the prohibition period allows for reliable continuation of charging of battery 150, though it may prolong the time required for completion of external charging as a whole, compared to the case with no prohibition period included.

External Charging Flow

Figure 5:
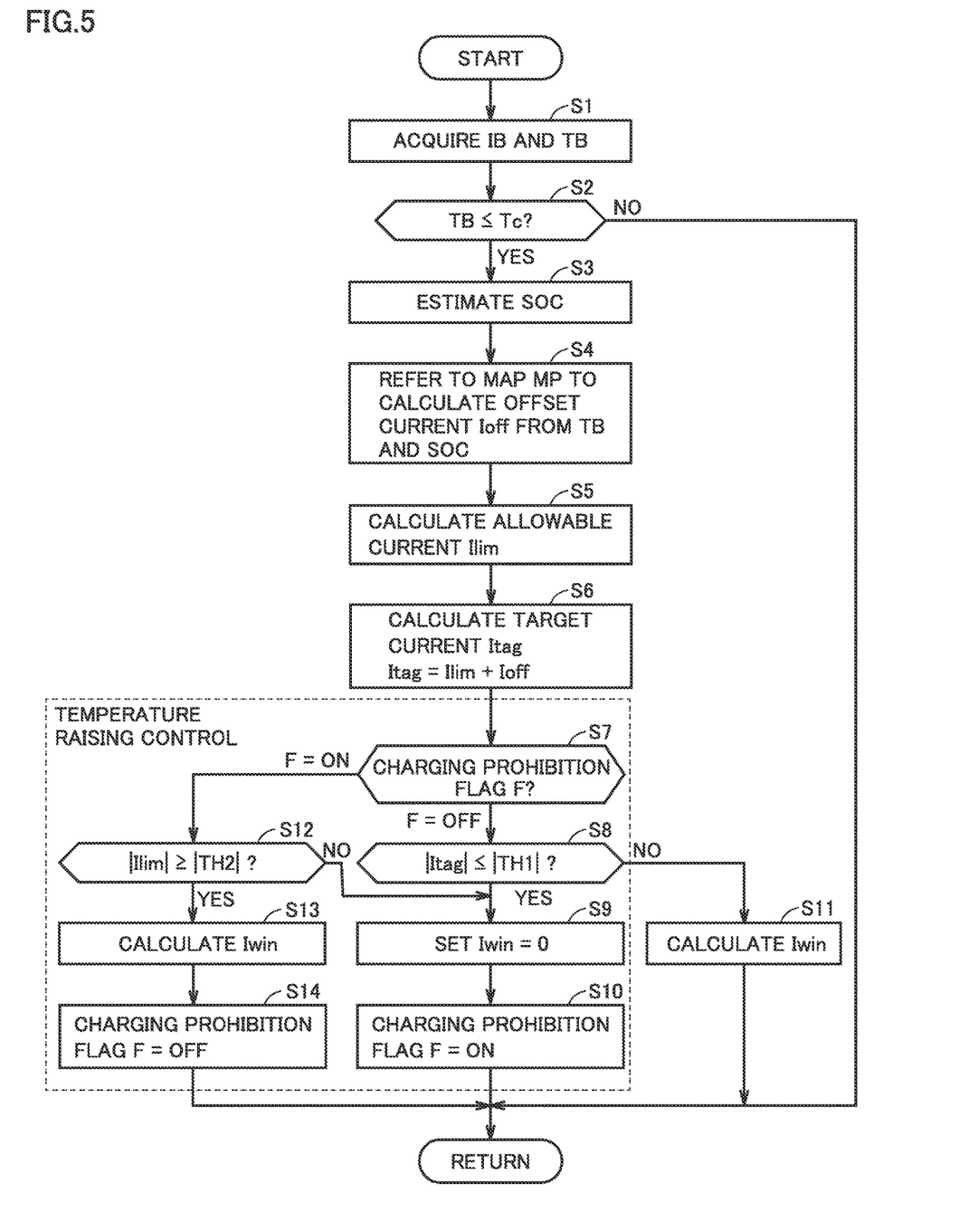
FIG. 5 is a flowchart showing the lithium deposition suppression control during external charging in the present embodiment.

FIG. 5 is a flowchart showing the lithium deposition suppression control during external charging in the present embodiment. The steps (hereinafter abbreviated to "S") included in the flowchart are basically implemented by software processing by ECU 100. The steps, however, may be implemented by dedicated hardware (electric circuit) provided in ECU 100.

Memory 102 of ECU 100 stores a charging prohibition flag F for switching between the prohibition period and the permission period. When charging prohibition flag F is ON, charging of battery 150 is prohibited. When charging prohibition flag F is OFF, charging of battery 150 is permitted. At the time of the start of external charging, charging prohibition flag F is OFF.

With reference to FIG. 1, FIG. 4, and FIG. 5, at S1, ECU 100 acquires current IB and temperature TB of battery 150 from current sensor 152 and temperature sensor 153, respectively.

At S2, ECU 100 determines whether or not temperature TB of battery 150 is lower than or equal to a prescribed temperature Tc. Prescribed temperature Tc is the temperature at which the lithium deposition conspicuously occurs. Prescribed temperature Tc is preferably a temperature below zero, more preferably a very low temperature (e.g. −20° C. or lower). Prescribed temperature Tc is predetermined by experiment or simulation and stored in memory 102 of ECU 100. If temperature TB of battery 150 is higher than prescribed temperature Tc (NO at S2), the process is returned to the main routine without executing the subsequent processes.

If temperature TB of battery 150 is lower than or equal to prescribed temperature Tc (YES at S2), ECU 100 estimates the SOC of battery 150 (S3). A known method, such as the current integration method, may be used as a method for estimating the SOC, which is not described in detail herein. The processes at and after S2 correspond to the "temperature raising control" according to the present disclosure.

At S4, ECU 100 refers to a map MP to calculate offset current Ioff from the SOC and temperature TB of battery 150.

Figure 6:
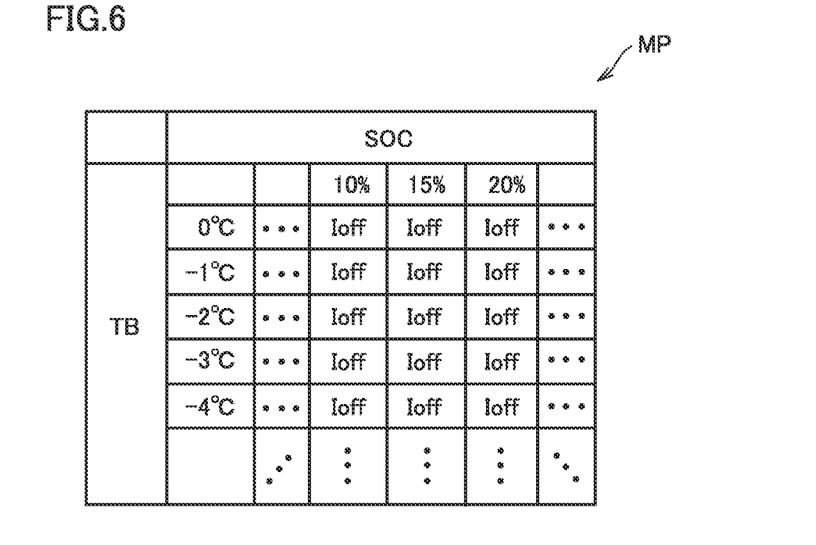
FIG. 6 shows an example map to be referred to at the process of S4 in the flowchart shown in FIG. 5.

FIG. 6 shows an example of map MP to be referred to at S4 in the flowchart shown in FIG. 5. As shown in FIG. 6, map MP defines offset current Ioff for each SOC and each temperature TB of battery 150. Preferably, the lower the temperature TB is, the greater the magnitude of offset current Ioff is. By referring to this map MP, offset current Ioff can be calculated from the SOC and temperature TB of battery 150. Note that the numerical values shown in FIG. 6 are merely by way of example for easy understanding.

Referring back to FIG. 5, at S5, ECU 100 calculates allowable current Ilim in accordance with the above formula (1), based on the SOC and temperature TB of battery 150. Further, ECU 100 calculates target current Itag by adding offset current Ioff to allowable current Ilim (S6).

At S7, ECU 100 determines whether charging prohibition flag F is ON or OFF. If charging prohibition flag F is OFF (F=OFF at S7), ECU 100 determines whether or not the magnitude of target current Itag is less than or equal to the magnitude of first threshold value TH1 (S8).

If the magnitude of target current Itag is greater than the magnitude of first threshold value TH1 (NO at S8), that is, if |Itag|>|TH1| is satisfied (see the period from time t20 to time t21), then ECU 100 determines that target current Itag has enough room for change in the discharging direction and that allowable charging power Iwin requires no restriction. Thus, ECU 100 calculates allowable charging power Iwin in accordance with the above formula (2) as usual (S11).

In contrast, if the magnitude of target current Itag is less than or equal to the magnitude of first threshold value TH1 (YES at S8), then ECU 100 determines that target current Itag has less room for change in the discharging direction, and forcibly restricts allowable charging power Iwin before target current Itag reaches 0. Specifically, ECU 100 sets allowable charging power Iwin to 0 (see S9 and time t21). ECU 100 then switches charging prohibition flag F from OFF to ON (S10).

If charging prohibition flag F is ON at S7 (F=ON at S7), ECU 100 determines whether or not the magnitude of allowable current Ilim is greater than or equal to the magnitude of second threshold value TH2 (S12). If the magnitude of allowable current Ilim is less than the magnitude of second threshold value TH2 (NO at S12), ECU 100 determines that more time is required for allowable current Ilim to recover, and maintains the state in which allowable charging power Iwin is restricted to 0 (see S9 and the period from time t21 to time t22).

When the magnitude of allowable current Ilim becomes greater than or equal to the magnitude of second threshold value TH2 (YES at S12, see time t22), ECU 100 moves the process to S13, relaxes the restriction on allowable charging power Iwin, and calculates allowable charging power Iwin in accordance with formula (2) again. Further, ECU 100 switches charging prohibition flag F from ON to OFF (S14).

As described above, according to the present embodiment, the execution of the lithium deposition suppression control can protect battery 150 from the lithium deposition. Further, if the magnitude of target current Itag is less than or equal to the magnitude of first threshold value TH1 at S8, allowable charging power Iwin is restricted to 0 (S9). Thus, target current Itag is prevented from becoming 0. This prevents the charging stop state of battery 150 from being maintained in the PI control shown in formula (2). Further, since allowable current Ilim recovers during the prohibition period, charging of battery 150 can be continued. Thus, the present embodiment can progress charging of battery 150 while protecting battery 150 from the lithium deposition. That is, charging of battery 150 and protection of battery 150 can both be achieved.

Although an embodiment of the present disclosure has been described, it should be understood that the embodiment disclosed herein is by way of example only in every respect, and is not to be taken by way of limitation. The scope of the present disclosure is defined by the terms of the appended claims and is intended to include any modification within the scope and meaning equivalent to the terms of the claims.

What is claimed is:

1. A secondary battery system comprising:
a battery which is a lithium-ion secondary battery; and
a controller configured to, when the battery is charged with electric power supplied from outside of the secondary battery system, execute a lithium deposition suppression control for suppressing deposition of metallic lithium on an anode of the battery,
the controller being configured, in the lithium deposition suppression control, to:
calculate an allowable current so that the allowable current decreases with charging of the battery and so that the allowable current increases with discharging of the battery, the allowable current being a maximum current that does not cause deposition of the metallic lithium on the anode;
calculate a target current by adding an offset current in a discharging direction to the allowable current;
calculate an allowable charging power for the battery as an amount of manipulation in a feedback control, the feedback control being a control for bringing a charging current to the battery closer to the target current; and
control charging of the battery so that a magnitude of a charging power to the battery does not exceed a magnitude of the allowable charging power,
the controller being configured to, when a temperature of the battery is below a prescribed temperature during execution of the lithium deposition suppression control, further execute a temperature raising control for raising the temperature of the battery by repeating charging and discharging of the battery,
the controller being configured, in the temperature raising control, to:

when a magnitude of the target current is below a first threshold value that is greater than 0, prohibit charging of the battery by restricting the allowable charging power to 0 instead of the feedback control, while discharging the battery; and when a magnitude of the allowable current exceeds a second threshold value that is greater than the first threshold value, resume charging of the battery by canceling the restriction on the allowable charging power.

2. The secondary battery system according to claim 1, wherein
the controller is configured to refer to a correspondence relation among a SOC of the battery, a temperature of the battery, and the offset current, to calculate the offset current from the SOC and the temperature of the battery.

3. A vehicle comprising:
the secondary battery system according to claim 1; and
an inlet configured to receive charging power for the battery.

4. A method for controlling a battery which is a lithium-ion secondary battery, the method comprising:
when the battery is charged with electric power supplied from outside, executing a lithium deposition suppression control for suppressing deposition of metallic lithium on an anode of the battery,
the executing of the lithium deposition suppression control including:
calculating an allowable current so that the allowable current decreases with charging of the battery and so that the allowable current increases with discharging of the battery, the allowable current being a maximum current that does not cause deposition of the metallic lithium on the anode;
calculating a target current by adding an offset current in a discharging direction to the allowable current; and
calculating an allowable charging power for the battery as an amount of manipulation in a feedback control, the feedback control being a control for bringing a charging current to the battery closer to the target current, charging of the battery being controlled so that a magnitude of a charging power to the battery does not exceed a magnitude of the allowable charging power, the method for controlling the battery further comprising, when a temperature of the battery is below a prescribed temperature during execution of the lithium deposition suppression control, executing a temperature raising control for raising the temperature of the battery by repeating charging and discharging of the battery, the temperature raising control being a control for:
when a magnitude of the target current is below a first threshold value that is greater than 0, prohibiting charging of the battery by restricting the allowable charging power to 0 instead of the feedback control, while discharging the battery; and when a magnitude of the allowable current exceeds a second threshold value, resuming charging of the battery by canceling restriction on the allowable charging power.

* * * * *